US012657751B2

(12) United States Patent
Peng et al.

(10) Patent No.: US 12,657,751 B2
(45) Date of Patent: Jun. 16, 2026

(54) METHOD AND APPARATUS WITH IMAGE PROCESSING

(71) Applicant: Samsung Electronics Co., Ltd., Suwon-si (KR)

(72) Inventors: Xiongfeng Peng, Beijing (CN); Zhihua Liu, Beijing (CN); Kyungboo Jung, Suwon-si (KR); Myungjae Jeon, Suwon-si (KR); Qiang Wang, Beijing (CN); Young Hun Sung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 18/597,107

(22) Filed: Mar. 6, 2024

(65) Prior Publication Data

US 2024/0303846 A1     Sep. 12, 2024

(30) Foreign Application Priority Data

Mar. 6, 2023    (CN) ......................... 202310246251.7
Jan. 11, 2024    (KR) ......................... 10-2024-0004802

(51) Int. Cl.
*G06T 7/579*     (2017.01)
*G06T 7/246*     (2017.01)
*G06T 7/73*     (2017.01)
*G06T 17/05*     (2011.01)

(52) U.S. Cl.
CPC .............. *G06T 7/579* (2017.01); *G06T 7/248* (2017.01); *G06T 7/74* (2017.01); *G06T 17/05* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 10,296,828 B2 * | 5/2019 | Viswanathan ..... | G01C 21/3811 |
| 11,093,753 B2 | 8/2021 | Kim et al. | |
| 11,442,463 B1 | 9/2022 | Fotland et al. | |
| 11,455,740 B2 | 9/2022 | Vendas Da Costa et al. | |
| 2019/0154449 A1 * | 5/2019 | Roumeliotis ...... | G01C 21/1656 |
| 2021/0190497 A1 | 6/2021 | Derhy et al. | |
| 2024/0104771 A1 * | 3/2024 | Zelek ..................... | G06T 7/579 |

FOREIGN PATENT DOCUMENTS

GB          2599948 A  *  4/2022  ............... G06T 7/73

* cited by examiner

*Primary Examiner* — James A Thompson
(74) *Attorney, Agent, or Firm* — NSIP Law

(57) ABSTRACT
A processor-implemented method includes obtaining a visual association feature indicating an association between a first image frame and a second image frame and a visual appearance feature indicating the same object appearance in the first image frame and the second image frame, constructing a visual reprojection constraint based on the visual association feature, constructing a visual feature metric constraint based on the visual appearance feature, and performing localization and mapping based on the visual reprojection constraint and the visual feature metric constraint.

20 Claims, 7 Drawing Sheets

$I_i$ , $I_j$

Visual association feature extraction module 211

Data association module 213

Dual visual feature extraction and association

Visual appearance feature extraction module 212

$IMU_{i \rightarrow j}$

IMU pre-integration module 220

Dual visual and inertial optimization module 230

$T_i$ , $M_i$ , $d_i$ , $T_j$ , $M_j$ , $d_j$

METHOD AND APPARATUS WITH IMAGE PROCESSING

CROSS-REFERENCE TO RELATED APPLICATIONS

This application claims the benefit under 35 USC § 119(a) of Chinese Patent Application No. 202310246251.7, filed on Mar. 6, 2023 in the China National Intellectual Property Administration, and Korean Patent Application No. 10-2024-0004802, filed on Jan. 11, 2024 in the Korean Intellectual Property Office, the entire disclosures of which are incorporated herein by reference for all purposes.

BACKGROUND

1. Field

The following description relates to a method and apparatus with image processing.

2. Description of Related Art

Simultaneous localization and mapping (SLAM) may refer to a technology for constructing in real time a three-dimensional (3D) map of the space where an electronic device is located using sensors such as a camera, an inertial measurement unit (IMU), and a radar of the electronic device, and determining in real time a pose (e.g., translation and rotation) of the electronic device on the map. The camera and the IMU are components provided in devices such as smartphones, augmented reality (AR) glasses, and indoor robots due to their small volumes, light weights, and energy efficiency. The camera may provide various information about an environment, and the IMU sensor may provide motion information, and they thus be used in combination to form a visual-inertial navigation system (VINS). The VINS may be used to estimate poses in applications (e.g., mobile AR and virtual reality (VR), autonomous vehicles, and unmanned aerial vehicles).

However, learning-based visual navigation system (VNS) methods applied to pose estimation may not achieve robust results in pose estimation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method with image processing includes: obtaining a visual association feature indicating an association between a first image frame and a second image frame and a visual appearance feature indicating the same object appearance in the first image frame and the second image frame; constructing a visual reprojection constraint based on the visual association feature; constructing a visual feature metric constraint based on the visual appearance feature; and performing localization and mapping based on the visual reprojection constraint and the visual feature metric constraint.

The constructing of the visual reprojection constraint based on the visual association feature may include: determining the second image frame associated with the first image frame based on the visual association feature; obtaining a first associated feature map comprising a feature indicating the association between the first image frame and the second image frame; obtaining a corrected mapping value by correcting a first mapping value in which an image measurement value of the first image frame is mapped to the second image frame based on the first associated feature map; and constructing the visual reprojection constraint based on the image measurement value of the first image frame and the corrected mapping value.

The obtaining of the corrected mapping value by correcting the first mapping value in which the image measurement value of the first image frame is mapped to the second image frame based on the first associated feature map may include: determining a flow correction feature map that corrects an optical flow error, based on the first associated feature map; and correcting the first mapping value in which the image measurement value of the first image frame is mapped to the second image frame based on the flow correction feature map.

The obtaining of the first associated feature map between the first image frame and the second image frame may include determining the first associated feature map between the first image frame and the second image frame from an associated feature matrix, using the first mapping value, and the associated feature matrix may be determined based on the visual association feature of the first image frame and the visual association feature of the second image frame.

The first mapping value may be obtained by mapping the image measurement value of the first image frame to the second image frame, based on first pose information estimated from the first image frame, inverse depth information, and second pose information estimated from the second image frame.

The constructing of the visual feature metric constraint based on the visual appearance feature may include: determining the second image frame associated with the first image frame based on the visual association feature; and constructing the visual feature metric constraint based on the visual appearance feature of the first image frame and the visual appearance feature of the second image frame.

The determining of the flow correction feature map based on the first associated feature map may include determining the flow correction feature map and a visual reprojection confidence, based on the first associated feature map, and the constructing of the visual reprojection constraint based on the visual association feature may include constructing the visual reprojection constraint based on the image measurement value of the first image frame, the corrected mapping value, and the visual reprojection confidence.

The determining of the flow correction feature map based on the first associated feature map may include determining the flow correction feature map and a visual feature metric confidence, based on the first associated feature map, and the constructing of the visual feature metric constraint based on the visual appearance feature may include constructing the visual feature metric constraint, based on the visual appearance feature of the first image frame, the visual appearance feature of the second image frame, and the visual feature metric confidence.

The determining of the flow correction feature map based on the first associated feature map may include obtaining any one or any combination of any two or more of the flow correction feature map, the visual reprojection confidence, and the visual feature metric confidence, by processing the first associated feature map, a context feature of the first image frame, and the first mapping value through a first neural network.

The method may include: obtaining one or more image frames comprising the first image frame using a sliding window; and updating pose information and inverse depth information of each of the one or more image frames, by performing local bundle adjustment based on the visual reprojection constraint and the visual feature metric constraint of each of the one or more image frames.

The method may include updating the pose information and the inverse depth information of each of the one or more image frames by performing global bundle adjustment based on the visual reprojection constraint and the visual feature metric constraint of the one or more image frames, in response to performing the local bundle adjustment on the one or more image frames.

The method may include: determining the second image frame associated with the first image frame based on the visual association feature; obtaining inertial measurement unit (IMU) data of the first image frame and the second image frame; and constructing an inertial constraint based on the IMU data, wherein the performing of the localization and mapping based on the visual reprojection constraint and the visual feature metric constraint may include: obtaining any one or any combination of any two or more of pose information, motion information, and inverse depth information of the first image frame by performing bundle adjustment based on the visual reprojection constraint, the visual feature metric constraint, and the inertial constraint; and performing the localization and mapping based on the obtained any one or any combination of any two or more of the pose information, the motion information, and the inverse depth information.

The constructing of the inertial constraint based on the IMU data may include: obtaining inertial motion association information about inertial motion from the first image frame to the second image frame and a pre-integrated weight by pre-integrating the IMU data; and constructing the inertial constraint based on the inertial motion association information and the pre-integrated weight.

The constructing of the inertial constraint based on the inertial motion association information and the pre-integrated weight may include: determining third pose information of the first image frame based on the inertial motion association information, the pose information, and the motion information; determining a second mapping value in which the image measurement value of the first image frame is mapped to the second image frame, based on the third pose information; determining a second associated feature map between the first image frame and the second image frame from an associated feature matrix using the second mapping value; obtaining an IMU confidence by processing the second associated feature map, a context feature of the first image frame, and the second mapping value, through a second neural network; obtaining an inertial weight based on the pre-integrated weight and the IMU confidence; and constructing the inertial constraint based on the inertial motion association information and the inertial weight.

The method may include: obtaining one or more image frames comprising the first image frame using a sliding window; and updating the pose information, the inverse depth information, and the motion information of each of the one or more image frames by performing local bundle adjustment based on the visual reprojection constraint, the visual feature metric constraint, and the inertial constraint of each of the one or more image frames.

The method may include updating the pose information, the inverse depth information, and the motion information of each of the one or more image frames by performing global bundle adjustment based on the visual reprojection constraint, the visual feature metric constraint, and the inertial constraint of the one or more image frames, in response to performing the local bundle adjustment on the one or more image frames.

In one or more general aspects, a non-transitory computer-readable storage medium may store instructions that, when executed by one or more processors, configure the one or more processors to perform any one, any combination, or all of operations and/or methods described herein.

In one or more general aspects, an electronic device includes: one or more processors configured to: obtain a visual association feature indicating an association between a first image frame and a second image frame and a visual appearance feature indicating the same object appearance in the first image frame and the second image frame; construct a visual reprojection constraint based on the visual association feature; construct a visual feature metric constraint based on the visual appearance feature; and perform localization and mapping based on the visual reprojection constraint and the visual feature metric constraint.

For the constructing of the visual reprojection constraint based on the visual association feature, the one or more processors may be configured to: determine the second image frame associated with the first image frame based on the visual association feature; obtain first associated feature map comprising a feature indicating the association between the first image frame and the second image frame; obtain a corrected mapping value by correcting a first mapping value in which an image measurement value of the first image frame is mapped to the second image frame based on the first associated feature map; and construct the visual reprojection constraint based on the image measurement value of the first image frame and the corrected mapping value.

For the obtaining of the corrected mapping value, the one or more processors may be configured to: determine a flow correction feature map that corrects an optical flow error based on the first associated feature map; and correct the first mapping value in which the image measurement value of the first image frame is mapped to the second image frame based on the flow correction feature map.

Other features and aspects will be apparent from the following detailed description, the drawings, and the claims.

Figure 1:
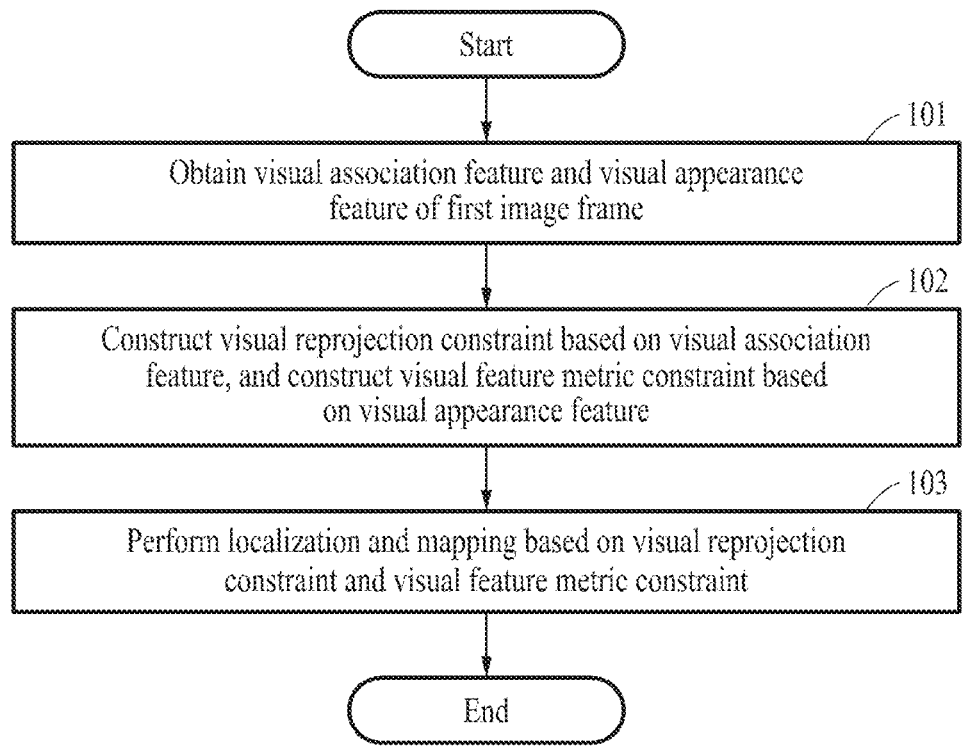
FIG. 1 illustrates an example of an image processing method according to one or more example embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of embodiments, detailed description of structures or functions that are thereby known after an understanding of the disclosure of the present application will be omitted when it is deemed that such description will cause ambiguous interpretation of the embodiments.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "on," "connected to," "coupled to," or "joined to" another component, element, or layer, it may be directly (e.g., in contact with the other component, element, or layer) "on," "connected to," "coupled to," or "joined to" the other component element, or layer, or there may reasonably be one or more other components elements, or layers intervening therebetween. When a component or element is described as "directly on", "directly connected to," "directly coupled to," or "directly joined to" another component element, or layer, there can be no other components, elements, or layers intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Hereinafter, example embodiments will be described in detail with reference to the accompanying drawings. When describing the example embodiments with reference to the accompanying drawings, like reference numerals refer to like components and a repeated description related thereto will be omitted.

A visual-inertial navigation system (VINS) technology may be used for mobile navigation applications.

However, typical VINS technology may have the following problems:

1) A lack of global information that reduces a motion drift accumulated over time.

2) Inaccurate visual data association in complex scenarios, e.g., non-robustness of pose estimation due to low quality and repeated texture.

3) Non-robustness of pose estimation due to extreme motions such as fast movements and pure rotations.

Such problems in the typical VINS technology may be intensified when low-cost and low-quality sensors are used. Typical VINS algorithms and deep learning-based VINS algorithms may use visual-inertial simultaneous localization and mapping (VI-SLAM) and visual-inertial odometry (VIO).

A VINS method may correspond to the following aspects.

1) Filter-based vs. optimization-based estimation: an initial task may be constructed based on probability and filters, and a map and a camera pose may be alternately optimized. A VINS may use a least square method, and one of the core factors for accuracy may be bundle adjustment (BA), which may optimize a camera pose and a three-dimensional (3D) map together in a single optimization problem. One of the advantages of the optimization-based method may be easily modifying a SLAM system to use various sensors.

2) Close vs. loose combination-based visual and inertial fusion: the loose combination-based fusion may separately measure visual and inertial values to determine respective estimates, and fuse these estimates, through which information loss may occur easily. In contrast, the tight combination-based fusion may directly fuse visual and inertial measurements in a single process to realize higher estimation accuracy.

3) Direct vs. indirect visual processing: the indirect method may extract and track point features in an environment and use a geometric reprojection constraint (or geometric transformation constraint) during the estimation. In contrast, the direct method may use raw pixel intensities and may include a greater rate of available image information. Due to the assumption of illumination consistency, direct image arrangement may require good initial estimation and a high frame rate, while indirect visual tracking may consume additional computational resources when extracting and matching features. Nevertheless, the indirect method may be used in practical applications due to its maturity and robustness. However, the direct method may have more potential in terms of optimizing texture-free scenes and high-resolution images.

4) Dense vs. sparse visual processing: the dense method may focus mainly on the direct method and 3D reconstruction of images and depth sensors (e.g., a red, green, and blue (RGB) and depth (D) (RGB-D) sensor) and may estimate poses and density depth. In contrast, the sparse method may focus mainly on the indirect method and may estimate poses and sparse maps.

A method may replace manually generated front ends with sparse features of learning and combining learned constraints and matchings with existing optimization back ends. A SLAM or visual odometry (VO) systems may be trained in dense visual processing, and these design ideas may start from an existing VNS method. CodeSLAM of a first real-time target single camera system may realize closely associated optimization in illumination density and geometric residual (or error) density. Deep Factors, the most complete deep learning-based SLAM system constructed on CodeSLAM, may combine dense luminance, sparse reprojection, and sparse geometric residuals (or errors) to realize associated optimization of pose and depth variables. BA-Net may adopt a network architecture and solve a structure-from-motion (SfM) problem through feature metric bundle adjustment (BA), which may explicitly forcefully execute multi-view geometric constraint optimization in the form of feature metric residuals. BA-Net may not be "dense," as it may optimize a small number of coefficients of a linearly combined depth basis (a set of pre-predicted depth maps), whereas digital record object identification (DROID) SLAM (DROID-SLAM) may optimize the depth of each pixel directly and may not be affected by the depth basis. In addition, BA-Net may optimize a feature metric residual (or error), while DROID-SLAM may optimize a reprojection residual (or error). In addition, DROID-SLAM may iteratively update an optical flow based on a ConvGRU network and iteratively update camera pose and pixel depth through dense bundle adjustment (DBA) to realize similar accuracy and greater robustness compared to the typical VINS method.

Although these deep learning-based systems are sometimes more robust, they do not fully fuse the advantages of cameras (e.g., single and dual cameras included) and inertial measurement units (IMUs), compared to the typical VINS method, and they also fail to fully use visual information. The indirect method based on a reprojection residual (also referred to herein as a "reprojection error") may be used in practical applications due to its maturity and robustness. The direct method based on an optical flow and a feature metric residual (also referred to herein as a "feature metric error") may have more potential in terms of optimization in texture-free scenarios and high-resolution image situations. A camera may provide rich environmental information and an IMU may provide motion information, and thus their combination may provide more robust pose estimation.

A method of one or more embodiments may realize a robust and accurate SLAM system by combining the indirect and direct methods and fusing the camera and IMU sensors, as described above. To this end, one or more embodiments of the present disclosure introduce deep visual inertial (DVI) SLAM (DVI-SLAM) that learns accurate camera poses by fusing visual and inertial information, and supports single, dual, RGB-D, and multi-sensor inputs such as an IMU. The one or more embodiments of present disclosure may also provide a multi-factor data association network, which learns, in addition to a corresponding relationship of a visual reprojection constraint, a visual reprojection confidence, a visual feature metric confidence, and an IMU confidence, and effectively combines the advantages of the direct and indirect methods to fully use visual information. The one or more embodiments of present disclosure may also provide a multi-factor data association network based on dual visual data and inertial measurements, which may fuse a visual reprojection constraint, a visual feature metric constraint, and an inertial constraint and may be more effective compared to the typical or learning-based SLAM systems.

Hereinafter, a method and device described herein according to example embodiments of the present disclosure will be described in detail with reference to the accompanying drawings.

FIG. 1 illustrates an example of an image processing method according to one or more example embodiments.

Referring to FIG. 1, the image processing method of one or more example embodiments of the present disclosure may be executed in an electronic device having an image processing function. The electronic device may be, for example, a smartphone, a tablet personal computer (PC), a portable computer, a desktop, and the like.

Referring to FIG. 1, in operation 101, the image processing method may obtain a visual association feature and a visual appearance feature of a first image frame. The visual association feature may represent an association between the first image frame and a second image frame.

The visual association feature may be used to determine an image frame having a certain association with a current image frame in a sequence of image frames (e.g., image frames in video streaming). The visual association feature may include, for example, a feature associated with an optical flow.

The visual appearance feature may represent the same object appearance in the first image frame and the second image frame. The visual appearance feature may include, for example, a feature for determining the same object in the first image frame and the second image frame. The visual appearance feature may be used for a subsequent feature constraint, as a current image frame and other image frames in a sequence of image frames are compared and features of different image frames are measured. The visual appearance feature may include, for example, a feature such as texture.

The visual association feature and the visual appearance feature may be features that may be extracted through a neural network.

For example, the image processing method may extract the visual association feature of the first image frame using a neural network. The neural network may include, for example, six residual networks and three downsampling layers, and generate a dense feature (e.g., the visual association feature) with ⅛ of the resolution of the first image frame.

In addition, the image processing method may extract the visual appearance feature of the first image frame using another neural network. For example, the image processing method may extract the visual appearance feature using a U-Net, and this neural network may include one encoding network and one decoding network to generate a dense feature (e.g., the visual appearance feature) with the resolution of the first image frame. The encoding network may include three submodules, and the three submodules may be connected in series. Each of the submodules may include two convolutional layers, and the back side of each submodule may include a single downsampling layer realized by maximum pooling. An input of a first submodule of the encoding network may be the first image frame, and an input of each subsequent submodule may be an output of a corresponding previous submodule. The decoding network may include three submodules, and the three submodules may be connected in series. In this example, an input of a first submodule may be an output of the last submodule of the encoding network. An input of each subsequent submodule may be an output of a corresponding previous submodule. During an operation of the decoding network, an upsampling operation may be performed to sequentially improve the resolution of an output of each submodule to match it to the resolution of the first image frame. The neural network that extracts the visual appearance feature may also use a skip connection to concatenate an upsampling result to an output of a submodule having the same resolution as the downsampling layer of the encoding network and use it as an input of a subsequent submodule of the decoding network.

The method of extracting the visual association feature and the visual appearance feature described above is provided only as an example, and the method is not limited to the foregoing.

According to one or more example embodiments, when the visual association feature and the visual appearance feature is extracted from each newly input image frame, the method described herein may add the visual association feature and the visual appearance feature of a corresponding image frame to a frame map G(V, E) and construct a plurality of new edges E in the existing image frame V. In this example, an edge E may represent a common view (or viewpoint) between two frames or the same area that may be viewed between two frames. The first image frame and the second image frame may be two image frames corresponding to one edge of a frame map. In an initial stage, the method may obtain a plurality of image frames from an input image stream, and initialize a frame map by generating edges between the image frames based on an average flow (e.g., an average value of optical flows) of the image frames.

In addition, to reduce computational resources, the method of one or more embodiments described herein may store only key frames and edges between the key frames in a frame map. For example, the method may set one image frame or some image frames as a key frame, and then determine whether a current image frame is the key frame by an average flow between the current image frame and the set key frame. The first image frame may represent a key frame or a newly input current image frame.

As described herein, the frame map may be used to associate image frames having the same view (or viewpoint) and construct a subsequent visual reprojection constraint and a subsequent visual feature metric constraint.

In operation 102, the method described herein may construct a visual reprojection constraint based on the visual association feature and construct a visual feature metric constraint based on the visual appearance feature.

A constraint described herein may be construed as a corresponding cost function and/or loss function, and may be used to realize optimization by minimizing a residual (also referred to herein as "error") and/or loss obtained from the cost function/loss function.

When constructing visual reprojection constraint, the method described herein may determine the second image frame associated with the first image frame based on the visual association feature and obtain a first associated feature map between the first image frame and the second image frame. The first associated feature map may include features indicating an association between the first image frame and the second image frame. In addition, the method may obtain a corrected mapping value by correcting a first mapping value in which an image measurement value of the first image frame is mapped to the second image frame, and may construct the visual reprojection constraint based on the image measurement value of the first image frame and the corrected mapping value.

For example, the method described herein may determine a flow correction feature map that corrects an optical flow error based on the first associated feature map. Th method may then obtain the corrected mapping value by correcting the first mapping value in which the image measurement value (e.g., pixel value, etc.) of the first image frame is mapped to the second image frame based on the flow correction feature map, and may construct the visual reprojection constraint based on the image measurement value of the first image frame and the corrected mapping value. In this example, the first mapping value may form a flow feature map, and the flow correction feature map may correct the flow feature map to correct the optical flow error. The method may obtain the flow correction feature map by processing the first associated feature map through a neural network.

As described above, the method described herein may extract the features of the first image frame and then add the features of the first image frame to the frame map to generate an edge with other frames that are already present in the frame map. For example, the method may determine the second image frame associated with the first image frame through the edge of the frame map.

Each edge of the frame map may form a 4-level associated feature matrix, as a four-dimensionally associated volume (e.g., associated feature matrix) may be calculated (e.g., determined) based on a visual association feature of two corresponding image frames, and average pooling may be performed on the last two dimensions of the associated volume. The 4-level associated feature matrix may include four four-dimensionally associated feature matrices having different resolutions. For example, the two image frames that are associated with each other may correspond to one 4-level associated feature matrix.

The 4-level associated feature matrix described above is provided only as an example, and other-level associated feature matrices may be pooled as needed.

When the 4-level associated feature matrix of the two image frames is obtained, a search operation may index the 4-level associated feature matrix using a network with radius (e.g., a network of a target size). The search operation may perform a search according to the radius of a coordinate grid, using the coordinate grid as an input, and search for a value from the 4-level associated feature matrix using bilinear interpolation. This operation may be applied to each associated feature matrix of the 4-level associated feature matrix, and may be used for subsequent optimization as it concatenates a search result at each level to calculate a final feature vector, for example, obtains the associated feature map between the two image frames.

For example, using a mapping value (e.g., a first mapping value) in which the image measurement value of the first image frame is mapped to the second image frame, the method described herein may determine the associated feature map between the first image frame and the second image frame from the associated feature matrix (e.g., the 4-level associated feature matrix corresponding to the first image frame and the second image frame).

For example, the first mapping value in which the image measurement value of the first image frame is mapped to the second image frame may be mapped by mapping the image measurement value of the first image frame to the second image frame, based on first pose information and inverse depth information estimated from the first image frame and second pose information estimated from the second image frame. The first pose information and the inverse depth information used for the mapping may be pose information and inverse depth information optimized by bundle adjustment (BA). In this specification, camera pose information and inverse depth information may be results obtained through iterative updates, examples of which will be described in detail below.

For example, when the first image frame is a newly input image frame, initial pose information and inverse depth information of the first image frame may be set through a previously associated image frame (e.g., the latest key frame), and pose information and inverse depth information estimated for the first image frame in a subsequent iteration process may be results of optimization performed through BA, examples of which will be described below.

When constructing the visual feature metric constraint, the method described herein may construct the visual feature metric constraint based on the visual appearance feature of the first image frame and the visual appearance feature of the second image frame.

According to another example embodiment, when constructing the visual reprojection constraint and the visual feature metric constraint, the method described herein may also consider a visual reprojection confidence and a visual feature metric confidence.

For example, the method described herein may determine the flow correction feature map and the visual reprojection confidence based on the first associated feature map, and may construct the visual reprojection constraint based on the image measurement value of the first image frame, the corrected mapping value, and the visual reprojection confidence. The method may determine the flow correction feature map and the visual reprojection confidence, using a neural network for the first associated feature map.

For another example, the method described herein may determine the flow correction feature map and the visual feature metric confidence based on the first associated feature map, and may construct the visual feature metric constraint based on the visual appearance feature of the first image frame, the visual appearance feature of the second image frame, and the visual feature metric confidence. The method may determine the flow correction feature map and the visual feature metric confidence using a neural network for the first associated feature map.

For still another example, the method described herein may determine the flow correction feature map, the visual reprojection confidence, and the visual feature metric confidence based on the first associated feature map, and may construct the visual reprojection constraint based on the image measurement value of the first image frame, the corrected mapping value, and the visual reprojection confidence and construct the visual feature metric constraint based on the visual appearance feature of the first image frame, the visual appearance feature of the second image frame, and the visual feature metric confidence.

For example, the method described herein may process the first associated feature map, a context feature map of the first image frame, and the flow feature map through a first neural network to obtain at least one of the flow correction feature map, the visual reprojection confidence, or the visual feature metric confidence. In this example, the first neural network may determine a flow correction feature map, a visual reprojection confidence, and a visual feature metric confidence of any two associated image frames.

For example, for each edge $(i, j) \in \varepsilon$ of a frame map, the method described herein may calculate a four-dimensionally associated volume $C_{ij}$ through a visual association feature corresponding to an ith frame $I_i$ (e.g., one corresponding to the first image frame) and a jth frame $I_j$ (e.g., one corresponding to the second image frame), and perform a search operation on the four-dimensionally associated volume $C_{ij}$ using $x_{ij}$ obtained through a mapping calculation, to search for an associated feature map.

In this example, $x_{ij} = \Pi(T_i, T_j, d_i, x_i)$, in which $x_i$ denotes one set of two-dimensional (2D) image measurement values (e.g., pixel values) of the ith frame, and $T_i$ and $T_j$ denote respective poses of the ith frame and the jth frame. In addition, $d_i$ denotes an inverse depth of the ith frame, and $\Pi$ demotes a mapping from the one set of the 2D image measurement values $x_i$ of the ith frame to the jth frame, through the pose and inverse depth. $x_{ij}$ denotes a mapping value from the one set of the 2D image measurement values $x_i$ of the ith frame to the jth frame. In this example, $T_i$, $T_j$, and $d_i$ may be results of optimization in response to BA.

Subsequently, the method described herein may input the retrieved associated feature map to a convolutional GRU (ConvGRU) network, design separately a flow correction network, a reprojection confidence network, and a feature metric confidence network to obtain confidences of different costs and a flow correction feature map from an output of the convolutional GRU network, and use the networks to output a flow correction feature map $r_{ij}$, a visual reprojection confidence $$w_{ij}^r,$$

and a visual feature metric confidence $$w_{ij}^f.$$

The flow correction feature map $r_{ij}$ may be used to construct a corresponding relationship $$(x_i, x_{ij}^*),$$

in which $$x_{ij}^* = r_{ij} + x_{ij}.$$

In this example, two 3*3 convolutions may be applied to the flow correction network, the reprojection confidence network, and the feature metric confidence network, and an S-function (e.g., sigmoid) may be applied to the reprojection confidence network and the feature metric confidence network.

In addition, the convolutional GRU network may also be related to an input of the context feature map and the flow feature map in addition to an input of the associated feature map. The context feature map may be obtained by processing the visual association feature through a neural network. Such data may be used to construct the visual reprojection constraint and the visual feature metric constraint to optimize a camera pose T and an inverse depth d. Subsequently, the optimized camera pose T and the optimized inverse depth d may be applied to the search for the associated feature map and the calculation of the flow feature map, and the overall process is an iterative update process.

In the example described above, the first neural network may be implemented as a network including the convolutional GRU network, the flow correction network, the reprojection confidence network, and the feature metric confidence network. Alternatively, the first neural network may be implemented as a single convolutional GRU network, which may include the flow correction network, the reprojection confidence network, and the feature metric confidence network. However, examples are not limited to the foregoing example.

For example, the method described herein may calculate a visual reprojection error (i.e. constraint) by combining the visual reprojection confidence $$w_{ij}^r$$

according to the corresponding relationship $$(x_i, x_{ij}^*),$$

and a reprojection cost function for the entire frame map may be defined as expressed in Equation 1 below, for example.

$$E^r(T, d) = \sum_{(i,j)\in\varepsilon} \left\| x_{ij}^* - \Pi(T_i, T_j, d_i, x_i) \right\|^2_{\Sigma_{ij}^r = diag w_{ij}^r} \qquad \text{Equation 1}$$

In Equation 1, $$\sum_{ij}^r = diag w_{ij}^r$$

denotes a covariance matrix of the visual reprojection confidence $$w_{ij}^r,$$

and is applied to $$x_{ij}^* - \Pi(T_i, T_i, d_i, x_i).$$

The method described herein may calculate a visual feature metric error (e.g., constraint) based on the visual appearance feature $(F_i, F_j)$ and the feature metric confidence $$w_{ij}^f$$

of the ith frame and the jth frame, and a visual feature metric cost function for the entire frame map may be defined as expressed in Equation 2 below, for example.

$$E^f(T, d) = \sum_{(i,j)\in\varepsilon} \left\| F_i(x_i) - F_j(\Pi(T_i, T_j, d_i, x_i)) \right\|^2_{\Sigma_{ij}^f = diag w_{ij}^f} \qquad \text{Equation 2}$$

In Equation 2, $$\sum_{ij}^f = diag w_{ij}^f$$

denotes a covariance matrix of the visual feature metric confidence $$w_{ij}^f,$$

and is applied to $F_i(x_i) - F_j(\alpha(T_i, T_j, d_i, x_i))$.

The method of one or more embodiments described herein may further learn the visual reprojection confidence and the visual feature metric confidence, in addition to the visual reprojection constraint and the visual feature metric constraint, and may thereby optimize a camera pose and achieve higher robustness and accuracy.

In operation 103, the method described herein may perform SLAM based on the visual reprojection constraint and the visual feature metric constraint.

For example, the method of one or more embodiments described herein may minimize a visual reprojection constraint and a visual feature metric constraint through BA, and update pose information and inverse depth information of an image frame to achieve more robust and accurate SLAM results.

In addition, the method described herein may perform local bundle adjustment (LBA) based on a visual reprojection constraint and a visual feature metric constraint of an image frame within a sliding window to update pose information and inverse depth information of the image frame within the sliding window. For example, the method may use a sliding window of a predetermined size (e.g., one window having a predetermined fixed number of frames) to obtain at least one image frame of an image according to a predetermined step size, and the at least one image frame may include the first image frame. The method may perform LBA based on a visual reprojection constraint and a visual feature metric constraint of each of the obtained at least one image frame to update pose information and inverse depth information of each of the at least one image frame. Alternatively, the method may perform I LBA based on a visual reprojection constraint, a visual feature metric constraint, and an inertial constraint of each of the obtained at least one image frame to update pose information, inverse depth information, and motion information of each of the at least one image frame.

For example, when the first image frame is a newly input image frame, and one sliding window with a fixed number of frames slides according to an input of an image stream until the sliding window includes the first image frame, the method described herein may obtain visual association features and visual appearance features of all image frames including the first image frame within the sliding window; construct a visual reprojection constraint based on a visual association feature of each image frame in the sliding window and construct a visual feature metric constraint based on a visual appearance feature of each image frame in the sliding window; and perform LBA based on the visual reprojection constraint and the visual feature metric constraint of each image frame in the sliding window to update pose information and inverse depth information of each image frame.

The method described herein may update pose information and inverse depth information of each image frame by performing global bundle adjustment (GBA) based on the visual reprojection constraint and the visual feature metric constraint of each image frame when the LBA is performed on the image frame.

A search query process for an associated feature map may depend on the resulting pose and inverse depth in response to BA, and the calculation of the pose and inverse depth may depend on BA based on the constraint function/cost function described above. The constraint function/cost function may depend on the associated feature map. Therefore, the overall process may be an iterative update process, which continues until these constraints converge.

According to another example embodiment, the method described herein may optimize at least one of camera pose information, motion information, or inverse depth information, using an inertial constraint, in addition to the visual reprojection constraint and the visual feature metric constraint described above.

For example, the method described herein may obtain inertial measurement unit (IMU) data of the first image frame and the second image frame and construct an inertial constraint based on the IMU data. The method may then perform BA based on the visual reprojection constraint, the visual feature metric constraint, and the inertial constraint, and may obtain at least one of pose information, motion information, or inverse depth information of the first image frame.

For example, the method described herein may pre-integrate IMU data of the first image frame and IMU data of the second image frame to obtain inertial motion association information and a pre-integrated weight of the first image frame and the second image frame and may then construct an inertial constraint based on the inertial motion association information and the pre-integrated weight. For example, the inertial motion association information may include at least one of rotational Jacobian, translational Jacobian, velocity Jacobian, and relative quantity information (e.g., rotational, translational, and velocity relative quantities). In this example, rotation, translation, and velocity may refer to rotation, translation, and velocity data of an IMU sensor in an international coordinate system. The rotation may be 3D angle information, and the translation may be position information. The rotational Jacobian, translational Jacobian, and velocity Jacobian may be solution parameters from non-linearlization to linearlization.

According to still another example embodiment, in a case in which there is an IMU input, in an existing close combination-based VI-SLAM method, a weight of an IMU deviation may be a correction constant, which may limit the robustness in actual applications. Accordingly, the method described herein may learn an IMU confidence by implicitly using pose estimates from IMU propagation, rather than raw IMU data input. The confidence may decrease as an error in pose estimation increases, and thus the importance of the IMU constraint may be dynamically changed depending on optimization iterations. For example, the method described herein may estimate pose information (or third pose information different from first pose information and second pose information in response to BA) and/or motion information of an image frame, using an IMU propagation algorithm, based on pre-integrated IMU data (e.g., the rotational, translational and velocity Jacobian, and the relative quantity information) and the optimized pose information and the optimized motion information; determine a second mapping value in which the image measurement value of the first image frame is mapped to the second image frame based on the estimated third pose information; and determine a second associated feature map between the first image frame and the second image frame from an associated feature matrix using the second mapping value. The method may obtain an IMU confidence by processing the second associated feature map, a context feature of the first image frame, and the second mapping value through a second neural network; obtain an inertial weight based on the pre-integrated weight and the IMU confidence; and construct an inertial constraint based on the rotational, translational, and velocity Jacobian, the relative quantity information, and the inertial weight. By constructing the inertial weight in which a learned IMU confidence and a pre-integrated IMU weight are combined, the method of one or more embodiments may improve the robustness of an optimization result.

For example, the second neural network may be implemented as including a convolutional GRU network and an IMU confidence network (e.g., implemented as a 3*3 convolution). Alternatively, the second neural network may be implemented as a single convolutional GRU network. The convolutional GRU network may include a 3*3 convolutional network. However, examples of the second neural network are not limited to the foregoing example which is provided only as an example.

For example, IMU measurements $(\alpha_{ij}, \omega_{ij})$ obtained from between ith and jth frames may provide a relative motion constraint, where a denotes an acceleration and $\omega$ denotes an angular velocity. The rotational, translational and velocity Jacobians $$(\Delta J_{ij}^r, \Delta J_{ij}^p, \Delta J_{ij}^v),$$

the rotational, translational, and velocity relative quantity $(\Delta R_{ij}, \Delta p_{ij}, \Delta v_{ij})$, and the pre-integrated weight $$(w_{ij}^{pu})$$

may be obtained through pre-integrated IMU calculation. In addition, $\hat{b}_i = (\hat{b}a_i, \hat{b}g_i)$ may be a bias estimate used during IMU pre-integration, and the inertial weight $$(w_{ij}^u = w_{ij}^{pu} * w_{ij}^{lu})$$

may be calculated through the pre-integrated weight $$(w_{ij}^{pu})$$

and the learned IMU confidence $$(w_{ij}^{lu}).$$

These may be used to calculate an inertial error, and optimize and update an IMU pose $T = (R, p)$ and an inertial motion $M = (v, ba, bg)$. In this example, R denotes rotation, p denotes translation, v denotes velocity, bg denotes an angular velocity bias amount, and ba denotes an acceleration bias amount. A difference between the IMU pose and the camera pose may be converted by a corrected external parameter. An inertial cost function between time-sequential key frames of the entire frame map may be defined as expressed by Equation 3 below, for example.

$$E^u(T, M) = \sum_{(i,j=i+1) \in \varepsilon} \left\| \begin{matrix} e_{ij}^T \\ e_{ij}^M \end{matrix} \right\|_{\Sigma_{ij}^u = diag w_{ij}^u}^2 \qquad \text{Equation 3}$$

where, $$e_{ij}^T = \begin{bmatrix} \mathrm{Log}\left( \left( \mathrm{Exp}(\Delta J_{ij}^r (bg_i - \hat{bg}_i)) \Delta R_{ij} \right)^T R_j^T R_i \right) \\ R_i^T \left( p_j - p_i - v_i \Delta t_{ij} - \frac{1}{2} g t_{ij}^2 \right) - \left( \Delta p_{ij} + \Delta J_{ij}^p (b_i - \hat{b}_i) \right) \end{bmatrix}$$

$$e_{ij}^M = \begin{bmatrix} R_i^T (v_j - v_i - g t_{ij}) - \left( \Delta v_{ij} + \Delta J_{ij}^v (b_i - \hat{b}_i) \right) \\ ba_j - ba_i \\ bg_j - bg_i \end{bmatrix}$$

In Equation 3, $$\sum_{ij}^u = diag w_{ij}^u$$

denotes a covariance matrix of the inertial weight $$(w_{ij}^u).$$

The method described herein may minimize a dual visual and inertial cost function E(T,M,d) through DBA to obtain updated camera pose, inverse depth, and motion. Through iterative updates, the system may output optimized values. Based on this, it is possible to secure the effectiveness of fusing different methods and different sensor constraints and obtain an optimized camera pose estimate. For example, the dual visual optimization may combine the robustness of the indirect method and the preciseness of the direct method to fully use visual information. In addition, the visual inertia optimization may combine the advantages of IMU's motion and camera's rich visual information, and the entire cost function may be defined as expressed by Equation 4 below, for example.

$$E(T, M, d) = E^r(T, d) + E^f(T, d) + E^u(T, M) \qquad \text{Equation 4}$$

In Equation 4, $E^r(T, d)$ and $E^f(T, d)$ may be a combined visual reprojection cost function and a combined visual feature metric cost function, respectively, and may also be a selected visual reprojection cost function and a selected visual feature metric cost function, respectively.

The method of one or more embodiments described herein may fuse a visual reprojection error, a visual feature metric error, and an inertial error, using dual visual information and inertial information, thereby providing more robust and accurate estimation of camera pose information, motion information, and inverse depth information.

The method described herein may perform LBA based on a visual reprojection constraint, a visual feature metric constraint, and an inertial constraint of an image frame within a sliding window to update pose information, motion information, and inverse depth information of the image frame within the sliding window. In addition, when the LBA is performed, the method described herein may perform GBA based on the visual reprojection constraint, the visual feature metric constraint, and the inertial constraint of each image frame included in an image to update the pose information and the inverse depth information of each image included in the image.

The method of one or more embodiments described herein may update the camera pose information, the inverse depth information, and the motion information iteratively, and accordingly the visual reprojection constraint, the visual feature metric constraint, and the inertial constraint may change in each iteration. The method of one or more embodiments may therefore obtain more robust and accurate camera pose, inverse depth, and motion through optimization.

Figure 2:
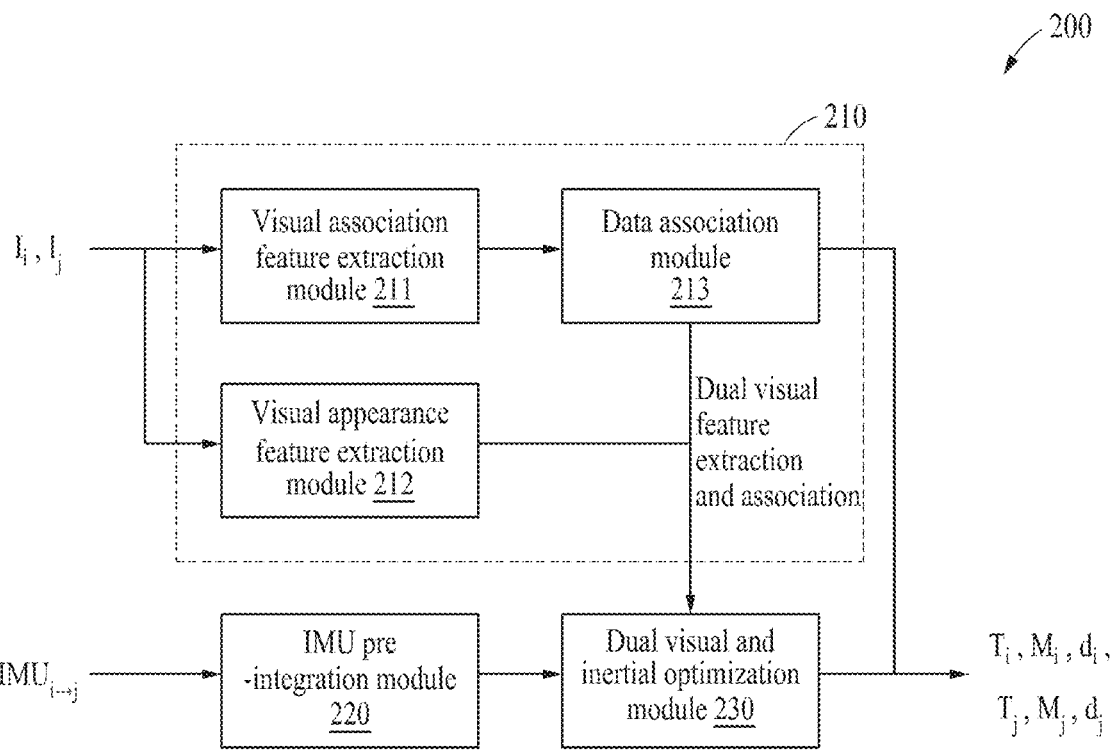
FIG. 2 illustrates an example of a flow in a localization and mapping system according to one or more example embodiments.

FIG. 2 illustrates an example of a flow in a localization and mapping system according to one or more example embodiments.

Referring to FIG. 2, a system 200 of one or more example embodiments of the present disclosure (also referred to herein as a SLAM system and/or a dual visual inertial SLAM (DVI-SLAM) system) may fuse dual visual information and inertial information to estimate at least one of camera pose information, motion information, and inverse depth information, and may support an input from, for example, a single sensor, a dual sensor, an RGB-D sensor, an IMU sensor, and a multi-sensor that corresponds to any combination of the foregoing sensors.

The system 200 may include a dual visual feature extraction and association module 210 including, for example, a visual association feature extraction module 211, a visual appearance feature extraction module 212, and a data association module 213, an IMU pre-integration module 220, and a dual visual and inertial optimization module 230. The modules described above may all be implemented using neural networks.

Hereinafter, two image frames Ii and Ij corresponding to one edge of a frame map will be described as an example. The visual association feature extraction module 211 that is based on deep learning may learn a visual association feature of the two image frames Ii and Ij. The visual appearance feature extraction module 212 that is based on deep learning may learn a visual appearance feature of the two image frames Ii and Ij. The data association module 213 may be used to construct a visual reprojection constraint and a visual feature metric constraint. The dual visual feature extraction and association module 210 of one or more embodiments may learn the visual reprojection constraint and the visual feature metric constraint and may also learn a visual reprojection confidence and a visual feature metric confidence, and may optimize a camera pose and an inverse depth to obtain a more robust and accurate SLAM result. The dual visual and inertial optimization module 230 may perform BA to minimize a visual reprojection error and a visual feature metric error obtained from the dual visual feature extraction and association module 210, and an inertial error obtained from the IMU pre-integration module 220 (e.g., obtained through IMU data (MIU i→j) of the two image frames). In response to the optimization through the BA, the camera pose and the inverse depth may be fed back to the data association module 210. The system 200 of one or more embodiments may obtain more robust and accurate camera pose information, motion information, and inverse depth information (e.g., Ti, Mi, di and Tj, Mj, dj) through iterations by the feedback.

Figure 3A:
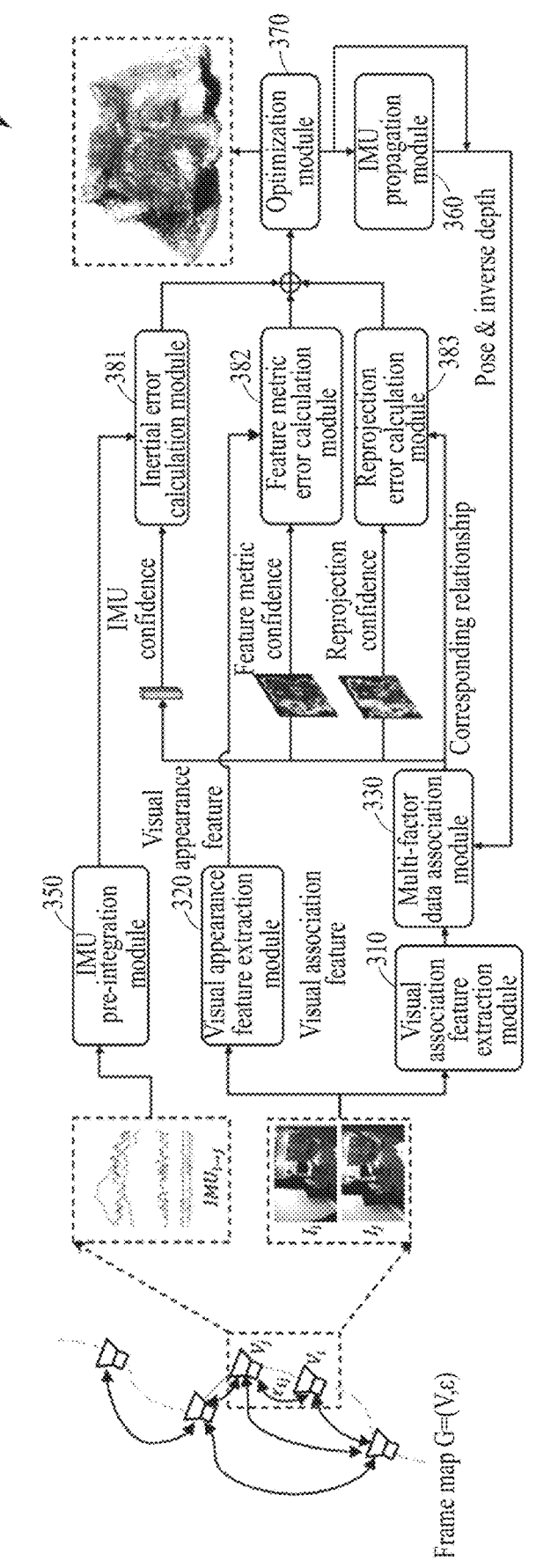
FIG. 3A illustrates an example of a flow in a localization and mapping system according to one or more example embodiments.

FIG. 3A illustrates an example of a flow in a localization and mapping system according to one or more example embodiments.

Figure 3B:
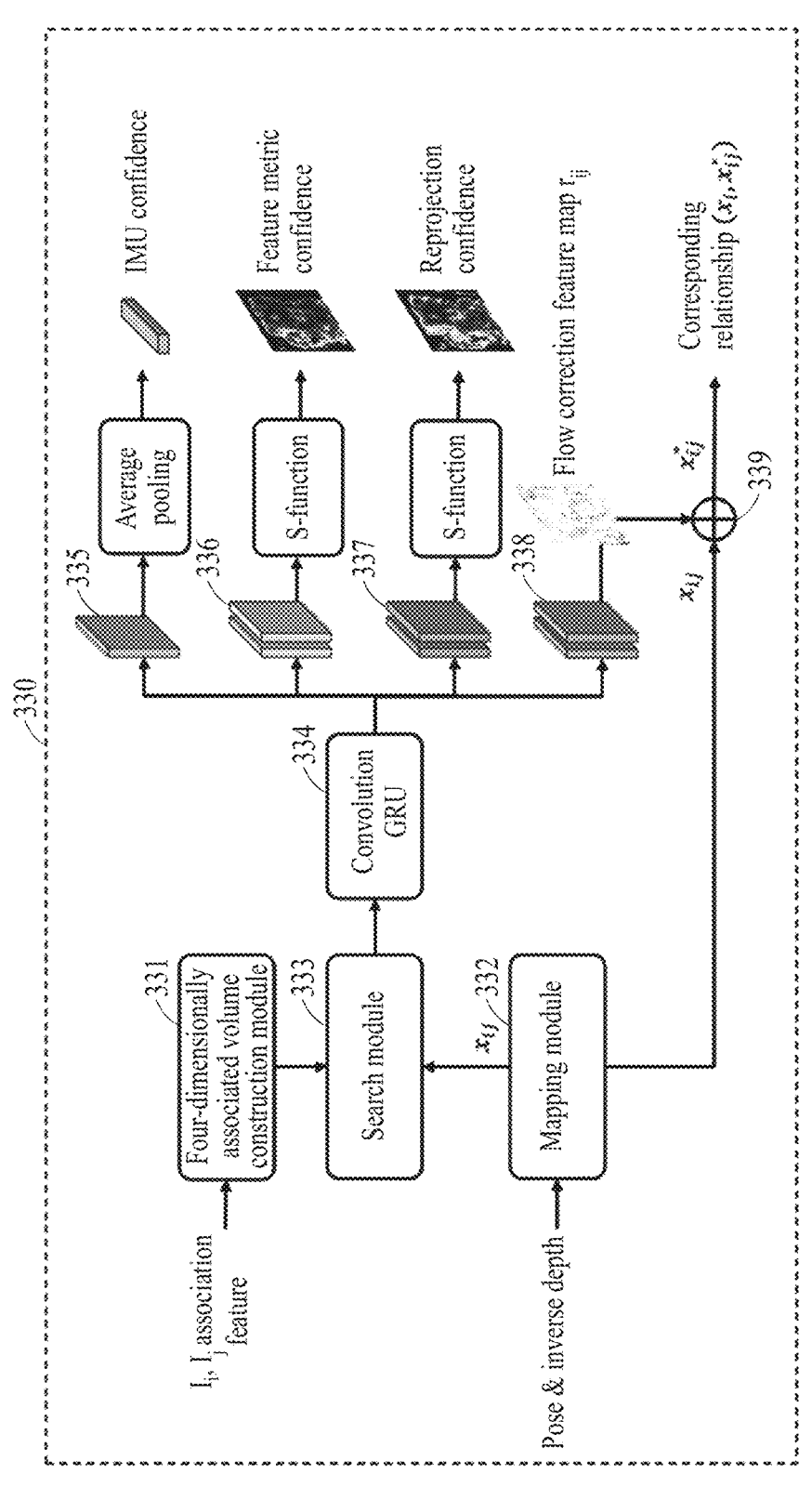
FIG. 3B illustrates an example of a flow of multi-factor data association according to one or more example embodiments.

FIG. 3B illustrates an example of a flow of multi-factor data association according to one or more example embodiments.

Figure 3C:
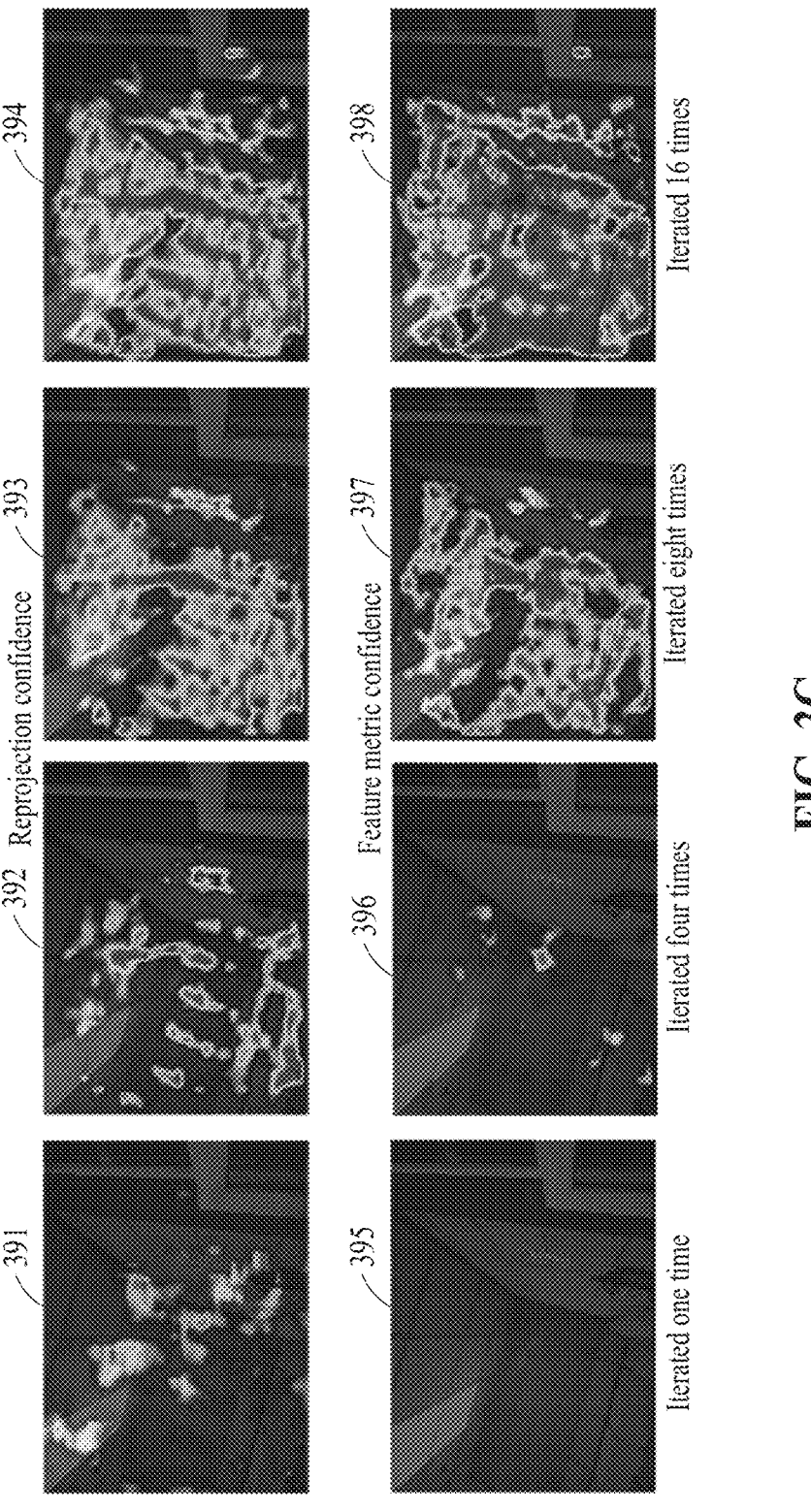
FIG. 3C illustrates an example of a process in which confidences change according to optimization iterations according to one or more example embodiments.

FIG. 3C illustrates an example of a process in which confidences change according to optimization iterations according to one or more example embodiments.

Referring to FIG. 3A, a DVI-SLAM system 300 may include a visual association feature extraction module 310, a visual appearance feature extraction module 320, a multi-factor data association module 330, an IMU pre-integration module 350, an IMU propagation module 360, and an optimization module 370. The modules described above may all be implemented using neural networks.

Hereinafter, a flow in the localization and mapping system shown in FIG. 3A will be described using, as an example, two image frames Ii and Ij corresponding to one edge of a frame map. The visual association feature extraction module 310 that is based on deep learning may learn a visual association feature of the two image frames Ii and Ij, and the visual appearance feature extraction module 320 that is based on deep learning may learn a visual appearance feature of the two image frames Ii and Ij, and they may construct a corresponding relationship of a visual reprojection constraint through the multi-factor data association module 330. The multi-factor data association module 330 may learn the corresponding relationship of the visual reprojection constraint and may also learn a visual reprojection confidence, a visual feature metric confidence, and an IMU confidence. The optimization module 370 may minimize a visual reprojection error, a visual feature metric error, and an inertial error through BA. In this example, the visual reprojection error may be calculated through a reprojection error calculation module 383, the visual feature metric error may be calculated through a feature metric error calculation module 382, and the inertial error may be calculated through an inertial error calculation module 381. The inertial error calculation module 381, the metric error calculation module 382, and the reprojection error calculation module 383 may be configured separately but may also be included in the optimization module 370.

In response to the optimization by the BA, the optimization module 370 may feed a camera pose and an inverse depth back to the multi-factor data association module 330. The DVI-SLAM system 300 of one or more embodiments may iterate such feedback to obtain more robust and accurate camera pose information, motion information, and inverse depth information (e.g., Ti, Mi, di, and Tj, Mj, dj).

For example, the visual association feature extraction module 310 and the visual appearance feature extraction module 320 may extract a visual association feature and a visual appearance feature, respectively, from each new image frame, and add them to the frame map (e.g., G(V, ε)) to construct an already present image frame V and a plurality of new edges E on the frame map G(V, ε). In this example, an edge E may represent a common view (or viewpoint) between two frames or the same area visible between the two frames. The multi-factor data association module 330 may iteratively update a corresponding relationship of an edge, a visual reprojection confidence, and a visual feature metric confidence. The visual appearance feature, the corresponding relationship, and the confidences described above may be used to calculate a visual reprojection error and a visual feature metric error.

The DVI-SLAM system 300 may extract the visual association feature using a learning-based neural network. For example, the DVI-SLAM system 300 may generate a dense feature map of ⅛ resolution of that of an input image by extracting a visual association feature (e.g., an optical flow feature) using a neural network (e.g., DROID-SLAM) including six residual networks and three downsampling layers. In addition, the DVI-SLAM system 300 may extract a context feature using a learning-based neural network. For example, the DVI-SLAM system 300 may extract a context feature using a neural network including six residual networks and three downsampling layers.

The DVI-SLAM system 300 may extract a visual association feature and a context feature from each new image and add them to a frame map to generate new edges along with other frames. For each edge in the frame map, it may calculate one four-dimensionally associated volume from one corresponding pair of image association features and perform average pooling on the last two dimensions of the associated volume to form one 4-level associated volume (or an associated volume including four resolutions). A search operation may index the associated volume using a network having a radius. The search operation may search for a value from the associated volume through bilinear interpolation, using a coordinate grid as an input. This operation may be applied to each of the 4-level associated volume and may calculate a final associated feature map by concatenating results of respective levels.

The DVI-SLAM system 300 may extract a visual appearance feature using a learning-based neural network. For example, the DVI-SLAM system 300 may extract a metric feature using ae U-Net feature extractor. The U-Net feature extractor may include an encoder and a decoder to generate a dense feature map with a resolution of an input image. The encoder may include three submodules each including two convolutional layers, and a downsampling layer implemented by maximum pooling behind each submodule. The decoder may include three submodules, and may improve a resolution sequentially until it matches the resolution of the input image through an upsampling operation. In addition, the neural network may also use skip connections to concatenate (or connect) an upsampling result and an output of a submodule of the same resolution of the encoder and use a result as an input of a subsequent submodule of the decoder.

The DVI-SLAM system 300 may extract a visual association feature, a context feature, and a visual appearance feature of a new image and add the visual association feature, the context feature, and the visual appearance feature to a frame map to connect them to other feature maps. The DVI-SLAM system 300 may iteratively learn a flow correction feature map, a visual reprojection confidence, and a visual feature metric confidence of a pair of images in the frame map.

Referring to FIG. 3B, a pair of images ith and jth (or Ii and Ij) of a frame map may be used as an example.

A four-dimensionally related (or associated) volume construction module 331 may calculate a four-dimensionally associated volume based on a visual association feature of Ii and Ij, for each edge ((i,j) $\in$ $\varepsilon$) of the frame map. In this example, Ii and Ij may correspond to the ith and jth frames, respectively.

A search module 333 may search a four-dimensionally associated volume $C_{ij}$ using a first mapping value $x_{ij}$ to obtain an associated feature map. In this example, a mapping module 332 may calculate the first mapping value $x_{ij}$ to provide it to the search module 333.

In this example, $x_{ij} = \Pi(T_i, T_j, d_i, x_i)$, where $x_i$ denotes a 2D image measurement value (e.g., a pixel value) of the ith frame, $T_i$ and $T_j$ denote poses of the ith frame and the jth frame, respectively, and $d_i$ denotes an inverse depth of the ith frame. In addition, a camera pose T and an inverse d may be results obtained in response to optimization through DBA, and f-denotes mapping from the 2D image measurement value $x_i$ of one set of the ith frame image to the jth frame, through the camera pose T and the inverse depth d. Subsequently, the search module 333 may input the retrieved associated feature map into a convolutional GRU network (ConvGRU) 334. The convolutional GRU network 334 may also be involved in an input of a context feature map and a flow feature map, in addition to the input of the associated feature map. The context feature map may be obtained as a visual association feature is processed through a neural network.

To obtain a confidence and a flow correction feature map of different costs from an output from the convolutional GRU network 334, a flow correction network 338, a reprojection confidence network 337, and a feature metric confidence network 336 may be designed separately and used to output a flow correction feature map $r_{ij}$, a visual reprojection confidence $$w_{ij}^r,$$

and a visual feature metric confidence $$w_{ij}^f.$$

The flow correction feature map $r_{ij}$ may be used to construct a corresponding relationship $$\left(x_i, x_{ij}^*\right)$$

through a corresponding relationship construction module 339. In this example, $$x_{ij}^* = r_{ij} + x_{ij}.$$

As shown in FIG. 3B, the flow correction network 338, the reprojection confidence network 337, and the feature metric confidence network 336 may each employ two 3*3 convolutional networks, and the reprojection confidence network 337 and the feature metric confidence network 336 may each employ an S-function (e.g., sigmoid). For example, the flow correction network 338 may apply a convolution operation to an output of the convolutional GRU network 334 to obtain a flow feature correction map. The reprojection confidence network 337 may apply a convolution operation and an S-function to an output of the convolutional GRU network 334 to obtain a reprojection confidence. The feature metric confidence network 336 may apply a convolution operation and an S-function to an output of the convolutional GRU network 334 to obtain a feature metric confidence. Each of the networks described above is provided only as an example and is not limited to the foregoing examples.

Referring again to FIG. 3A, when a feature metric confidence and a reprojection confidence are calculated in the multi-factor data association module 330, the metric error calculation module 382 may calculate a feature metric error, and the reprojection error calculation module 383 may calculate a reprojection error. The optimization module 370 may optimize a camera pose T and an inverse depth d by receiving error data. Subsequently, the optimized camera pose T and the optimized inverse depth d may be applied to the multi-factor data association module 330, and the entire process may be an iterative update process. In this example, the number of iterations may be determined by hyperparameters.

In addition, when there is an input of IMU data, the DVI-SLAM system 300 may optimize motion M and may estimate pose and motion of time-sequential key frames based on pre-integrated IMU data and the optimized motion and pose through an IMU propagation algorithm (e.g., used in the IMU propagation module 360). The multi-factor data association module 330 may construct an inertial weight by combining a learned IMU confidence and a pre-integrated IMU weight based on the re-estimated pose.

For example, the IMU propagation module 360 may estimate pose information (e.g., one that is different from a pose optimized through BA) and motion information of an image frame using the IMU propagation algorithm, based on the pre-integrated IMU data (e.g., rotational, translational, and velocity Jacobians, and relative quantity information) and the optimized pose information and motion information.

The multi-factor data association module 330 may determine a second mapping value in which an image measurement value of a first image frame is mapped to a second image frame based on estimated pose information, and may determine another associated feature map between the first image frame and the second image frame from an associated feature matrix, using the second mapping value. The multi-factor data association module 330 may obtain an IMU confidence by processing the other associated feature map, a context feature of the first image frame, and the second mapping value through another convolutional GRU network; obtain an inertial weight based on a pre-integrated weight and the IMU confidence; and construct an inertial constraint based on the rotational, translational, and velocity Jacobians, the relative quantity information, and the inertial weight. In addition, the DVI-SLAM system 300 of one or more embodiments may construct the inertial weight in which the learned IMU confidence and the pre-integrated IMU weight are combined to improve the robustness of an optimization result.

The multi-factor data association module 330 of FIG. 3A may include two convolutional GRUs (not shown)—one is used to calculate a feature metric confidence and a reprojection confidence, and the other is used to calculate an IMU confidence (e.g., used when there is an input of IMU data). In such a situation, the convolutional GRU 334 of FIG. 3B may include the two convolutional GRUs (not shown) described above. The convolutional GRU for calculating a reprojection confidence and a feature metric confidence may process an associated feature map (e.g., a first associated feature map) retrieved based on an optimized pose. The convolutional GRU for calculating an IMU confidence may process an associated feature map (e.g., a second associated feature map) retrieved based on an estimated pose. An output of the convolutional GRU for calculating an IMU confidence may be input into a 3*3 convolutional network 335 and may then pass through average pooling, and an IMU confidence may be thereby obtained. The networks described above may be provided only as examples, and the networks are not limited to the foregoing examples.

Unlike Deep Factors described above, a reprojection error and a feature metric error may be combined in a data driven manner. The explicit feature matching used for the reprojection error may be used to avoid a local minimum value, which may play an important role in an early stage of optimization. When both camera pose and depth values are good, a feature metric factor may be used to guide the optimization to a true minimum value.

Referring to FIG. 3C, two different confidence maps are shown, where, when an iteration begins, the uncertainty of a feature metric confidence 395 may be relatively high and the uncertainty of a reprojection confidence 391 may be relatively low. As the number of iterations increases, the uncertainty of a reprojection confidence (e.g., 392, 393, and 394) and a feature metric confidence (e.g., 396, 397, and 398) may decrease gradually. Positions with high confidence may all have good textures in both reprojection and feature metric confidence maps. In an area with good texture, explicit and implicit corresponding relationships may be easily constructed. It may be reasonable that there are different uncertainties at different iteration stages because different clues may be useful at different stages of optimization.

To estimate a more robust and accurate camera pose, dual visual optimization and inertial optimization are introduced herein, and DBA optimization may be used to minimize a visual reprojection error (or VRR), a visual feature metric error (or VFR), and an inertial error (or IR). In this example, cost functions for calculating these errors, such as, a visual reprojection cost function, a visual feature metric cost function, and an inertial cost function, may be expressed by Equations 1, 2, and 3 described above.

According to example embodiments, minimizing overall the dual visual and inertial cost functions (e.g., Equation 4 above) may ensure the effectiveness of fusing different methods and different sensor constraints and obtain an optimized estimate of camera pose. For example, dual visual information may be fully used as the robustness of the indirect method and the preciseness of the direct method are optimized and combined. The visual-inertial optimization may combine IMU's motion and camera's rich visual information.

In training, a visual network may be trained with single image data from a TartanAir synthetic dataset, and an inertial association parameter may be learned from an MH-02 sequence from an EuRoC dataset. The network may be monitored using weights of a pose loss $L_{pose}$, an optical flow loss $L_{flow}$, a visual reprojection loss $L_{repro}$, and a visual feature metric loss $L_{metric}$. The pose loss $L_{pose}$ may be considered a distance between a real pose and a predicted pose. The optical flow loss $L_{flow}$ may be a distance between a real flow and a predicted flow, and the real flow may be transformed by the real pose and depth. The visual reprojection loss $L_{repro}$ and the visual feature metric loss $L_{metric}$ may be similar to a visual reprojection error and a visual feature metric error, but may use 1-norm without including a weight.

$$L = w1 * L_{pose} + w2 * L_{flow} + w3 * L_{repro} + w4 * L_{metric} \qquad \text{Equation 5}$$

In Equation 5 above, L denotes a total loss, which is a sum of weights of all other losses, for example, four weight parameters may include w1=10, w2=0.05, w3=0.01, and w4=0.01.

The training process described above may be provided only as an example and is not limited thereto.

According to one or more example embodiments, a DVI-SLAM system may use, as an input, a single image stream or an image stream to which an IMU data stream is added, and the system may output camera pose information and inverse depth information in two modes-one is for odometry-based camera pose output to optimize a current frame and a plurality of key frames through LBA; and the other is based on a SLAM result to optimize an entire recording of key frames using a GBA optimizer. There may be a major difference between the two in that the odometry-based output is for local optimization of a local sliding window, while the SLAM result-based one uses a global optimization value that reflects therein the accuracy of a reconstructed global map. Hereinafter, initialization of the DVI-SLAM system, and VIO and VI-SLAM processes will be described in detail.

According to one or more example embodiments, when an image stream is input to the DVI-SLAM system during the initialization process, a plurality of key frames may be collected. A criterion by which a current frame becomes a key frame may be determined by an average flow between the frame and a most recent key frame in a time domain. When a predetermined number of key frames are collected, a frame map may be constructed between the key frames. A corresponding relationship and a confidence may be iteratively updated through data association between the key frames of the frame map, and then camera pose information and inverse depth information may be iteratively updated through DBA. According to one or more example embodiments, when an additional IMU stream is input, a gravity direction and motion may be initialized according to estimated camera pose information and IMU data. In the case of a single image stream, in particular, the size thereof may also be initialized. Subsequently, DBA may be performed to further optimize all visual and inertial states.

Similar to an existing sliding window-based method, visual odometry may optimize key frames within a local sliding window of a frame map and output a local optimum value. For example, for a new frame and a corresponding IMU stream, an average flow between the new frame and a most recent key frame may first be estimated. In this example, when an average flow value is greater than a preset threshold value, the new frame may be considered a key frame and added to a sliding window and the frame map, and then temporally adjacent key frames and edges may be constructed. According to one or more example embodiments, in BA optimization, only when an image stream is input, pose information and inverse depth information of a new frame may be initialized through a most recent key frame. In BA optimization, when there is an additional IMU stream, IMU pre-integration may be used to initialize pose information and IMU motion information of a new frame. According to one or more example embodiments, to maintain the size of the window consistently, an average flow of two most recent key frames before a current key frame may be calculated. In this example, when the average flow is relatively small, a second recent key frame may no longer be needed and may thus be removed; otherwise, in response to optimization through DBA in several iterations, the oldest key frame may be deleted from the sliding window. According to one or more example embodiments, to obtain a pose that is not a key frame, BA for optimizing only a pose may be implemented.

According to one or more example embodiments, VI-SLAM optimization may optimize the entire recording of key frames through separate GBA based on VIO. Particularly, in response to VIO, a frame map may be reconstructed by using newly optimized pose and inverse depth information and calculating an average flow between all key frame pairs. Unlike the construction of a frame map in the VIO process, an edge may first be added between temporally adjacent key frames, and a new edge may be sampled through the alignment of average flows between the key frames in ascending order. To prevent duplicate edges, adjacent edges of a selected edge may be suppressed. Through this strategy, key frames in a frame map may be connected both spatially and temporally. Based on the new frame map, pose information, inverse depth information, and motion information for every key frame may be updated and optimized. The process described above may be performed twice, and the performance may be stable.

Figure 4:
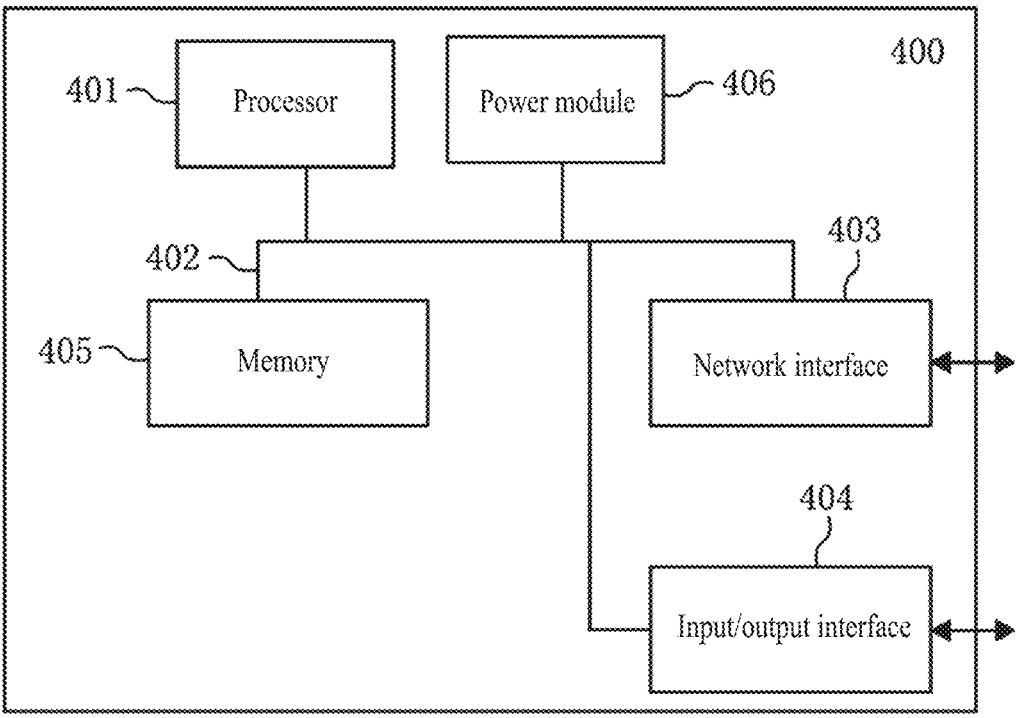
FIG. 4 illustrates a schematic structure of an image processing device in a hardware operating environment according to one or more example embodiments.

FIG. 4 illustrates a schematic structure of an image processing device in a hardware operating environment according to one or more example embodiments.

An image processing device 400 may implement the localization and mapping function described above.

Referring to FIG. 4, the image processing device 400 may include a processor 401 (e.g., one or more processors), a communication bus 402, a network interface 403, an input/output interface 404, a memory 405 (e.g., one or more memories), and a power module 406. In this example, the communication bus 402 may implement connection and communication signals among the components described above. The input/output interface 404 may include an image display (e.g., a liquid-crystal display (LDC)), a microphone, a speaker, and a user interaction interface (e.g., keyboard, mouse, touch input device, etc.). Additionally, the input/output interface 404 may further include a standard wired interface or a wireless interface. The network interface 403 may additionally include a standard wired interface and a wireless interface (e.g., a wireless fidelity (Wi-Fi) interface). The memory 405 may be a high-speed random-access memory (RAM) or a stable non-volatile memory. Alternatively, the memory 405 may be a storage device independent of the processor 401. The image processing device 400 may further include various sensors.

The input/output interface 404 may receive image streams and/or IMU data streams.

The processor 401 may learn a visual association feature and a visual appearance feature based on an image stream and/or IMU data stream; construct a visual reprojection constraint, a visual feature metric constraint, and an inertial constraint between a new image and an image of a frame map through a multi-factor data association operation; minimize a visual reprojection error, a visual feature metric error, and an inertial error through DBA-based optimization; and feed a camera pose and depth back to the multi-factor data association operation in response to the DBA-based optimization. Such a process of one or more embodiments may be performed iteratively to obtain more robust and accurate camera pose information, depth information, and inertial motion information.

A neural network for implementing SLAM may be trained by the image processing device 400 or may be trained externally.

Those skilled in the art will understand that the image processing device 400 is not limited to the structure shown in FIG. 4 but may include more or fewer components than illustrated, and some of the components may be combined and other components may also be provided.

As shown in FIG. 4, the memory 405 as a storage medium may include an operating system (OS), a data storage module, a network communication module, a user interface (UI) module, and a program and a database (DB) related to the image processing method and/or training method described above.

In the image processing device 400 shown in FIG. 4, the network interface 403 may be mainly used for data communication with external devices/terminals. The input/output interface 404 may be mainly used for data interaction with a user. The processor 401 and the memory 405 of the image processing device 400 may be installed in the image processing device 400, or the image processing device 400 may implement the image processing method described herein by calling various application programming interfaces (APIs) provided by a program and an OS for implementing the image processing method stored in the memory 405.

The processor 401 may include at least one processor, and the memory 405 may store a set of computer-executable instructions. When the set of computer-executable instructions is executed by the at least one processor, the image processing method described herein may be implemented. For example, the memory 405 may include a non-transitory computer-readable storage medium storing instructions that, when executed by the processor 401, configure the processor 401 to perform any one, any combination, or all of the operations and methods disclosed herein with reference FIGS. 1-4. The processor 401 may implement the localization and mapping process described above. However, examples are not limited thereto.

For example, the image processing device 400 may be a personal computer (PC), a tablet device, a personal digital assistant (PDA), a smartphone, or any other device capable of executing the set of instructions. The image processing device 400 may not necessarily be a single electronic device but may be a set of any devices or circuits capable of individually or jointly executing the instructions (or the set of instructions) described above. The image processing device 400 may also be part of an integrated control system or system manager, or may be implemented as a portable electronic device that is connected locally or remotely (e.g., via wireless transmission) through an interface.

In the image processing device 400, the processor 401 may include a central processing unit (CPU), a graphics processing unit (GPU), a programmable logic device, a special purpose processor system, a microcontroller, or a microprocessor. The processor 401 may also include, as non-limiting examples, an analog processor, a digital processor, a microprocessor, a multi-core processor, a processor array, and a network processor.

The processor 401 may execute instructions or codes stored in the memory 405. In this example, the memory 405 may further store data. The instructions and data may also be transmitted and received over a network via the network interface 403, and the network interface 403 may employ any known transport protocol.

The memory 405 may be integrated with the processor 401, in the form of arranging a RAM or flash memory within an integrated circuit (IC) microprocessor. Additionally, the memory 405 may include a separate device, such as, for example, an external disk drive, a storage array, or any other storage device that may be used by a DB system. The operations of the memory 405 and the processor 401 may be combined. For example, they may communicate with each other through input/output (I/O) ports and network connection, and the processor 401 may thereby read files stored in the memory 405.

One or more example embodiments of the present disclosure provide an electronic device.

Figure 5:
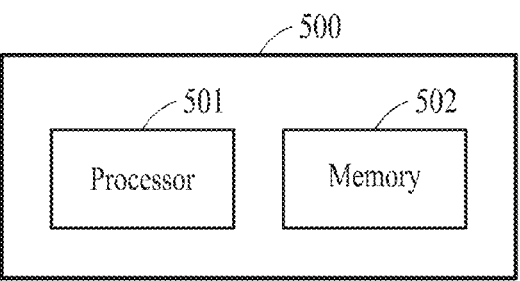
FIG. 5 illustrates an example of a configuration of an electronic device according to one or more example embodiments.

FIG. 5 illustrates an example of a configuration of an electronic device according to one or more example embodiments.

Referring to FIG. 5, an electronic device 500 may include a memory 502 (e.g., one or more memories) and a processor 501 (e.g., one or more processors). The memory 502 may store a set of computer-executable instructions, and when the set of computer-executable instructions is executed by the processor 501, an image processing method of one or more example embodiments may be implemented. For example, the memory 502 may include a non-transitory computer-readable storage medium storing instructions that, when executed by the processor 501, configure the processor 501 to perform any one, any combination, or all of the operations and methods disclosed herein with reference FIGS. 1-5.

The processor 501 may include, as non-limiting examples, a CPU, an audio-video processing unit (e.g., GPU), a programmable logic device, a special purpose processor system, a microcontroller or microprocessor, or a location tracking system. The processor 501 may also include, as non-limiting examples, an analog processor, a digital processor, a microprocessor, a multi-core processor, a processor array, or a network processor.

The memory 502 as a storage medium may include an OS, a data storage module, a network communication module, a UI module, and a DB.

The memory 502 may be integrated with the processor 501 by arranging a RAM or flash memory within an IC microprocessor. The memory 502 may also include a separate device, such as, for example, an external disk drive, a storage array, or any other storage device that may be used by a DB system. The operations of the memory 502 and the processor 501 may be combined. For example, they may communicate with each other through an I/O port, a network connection, or the like to allow the processor 501 to read files stored in the memory 502.

The electronic device 500 may also include an image display (e.g., LCD) and a user interaction interface (e.g., keyboard, mouse, touch input device, etc.). All the components of the electronic device 500 may be connected to each other through a bus and/or network.

For example, the electronic device 500 may be a PC, a tablet device, a personal digital assistant (PDA), a smartphone, or any other device that executes the set of instructions described above. In this example, the electronic device 500 may not necessarily be a single electronic device, but any device or set of circuits that may individually or jointly execute the instructions (or the set of instructions) described above. The electronic device 500 may also be part of an integrated control system or system manager, or may be implemented as a portable electronic device that is connected locally or remotely (e.g., via wireless transmission) through an interface.

Those skilled in the art will understand that the example embodiments of the present disclosure are not limited to the structure shown in FIG. 5, but more or fewer components than illustrated may be included. In addition, those skilled in the art will understand that and some of the components may be combined, and other components may be provided.

At least one of the plurality of modules described herein may be implemented through an artificial intelligence (AI) model. AI-related functions may be performed by a non-volatile memory, a volatile memory, and a processor.

In this example, the processor may include at least one processor. The at least one processor may be a general-purpose processor (e.g., a CPU, an application processor (AP), etc.) or a pure GPU (e.g., a GPU, a visual processing unit (VPU)), and/or an AI-specific processor (e.g., a neural processing unit (NPU)).

The at least one processor may control the processing of input data according to predefined operation rules or AI models stored in a non-volatile memory and a volatile memory, or may provide predefined operation rules or AI models through training or learning. In this example, the providing by training or learning may be applying a learning algorithm to a plurality of learning data to obtain an AI model with predefined operation rules or desired characteristics. This learning may be performed on a device itself that performs AI, and/or may be implemented by a separate server/system.

The learning algorithm may be a method of training a predetermined target device (e.g., a robot) using a plurality of learning data, and allowing the target device to perform determination, prediction, or control. Examples of the learning algorithm may include, but are not limited to, supervised learning, unsupervised learning, semi-supervised learning, or reinforcement learning.

An AI model may be obtained through training or learning. In this example, "obtaining the AI model through training or learning" may indicate that, as a basic AI model is trained with a plurality of learning data through a learning algorithm, a predefined operation rule or AI model that is configured to perform desired characteristics (or intents) is obtained.

For example, the AI model may include a plurality of layers of a neural network. Each of the layers may have a plurality of weight values, and the calculation of the neural network may be performed based on a calculation result obtained from a previous layer and a plurality of weights. The neural network may include, as non-limiting examples, a convolutional neural network (CNN), a deep neural network (DNN), a recurrent neural network (RNN), a restricted Boltzmann machine (RBM), a deep belief network (DBN), a bidirectional recurrent deep neural network (BRDNN), and a generative adversarial network (GAN), and a deep Q network.

The systems, dual visual feature extraction and association modules, visual association feature extraction modules, visual appearance feature extraction modules, data association modules, IMU pre-integration modules, dual visual and inertial optimization modules, DVI-SLAM systems, multi-factor data association modules, IMU propagation modules, optimization modules, reprojection error calculation modules, feature metric error calculation modules, inertial error calculation modules, volume construction modules, search modules, mapping modules, relationship construction modules, image processing devices, processors, communication buses, network interfaces, input/output interfaces, memories, power modules, electronic devices, system 200, dual visual feature extraction and association module 210, visual association feature extraction module 211, visual appearance feature extraction module 212, data association module 213, IMU pre-integration module 220, dual visual and inertial optimization module 230, DVI-SLAM system 300, visual association feature extraction module 310, visual appearance feature extraction module 320, multi-factor data association module 330, IMU pre-integration module 350, IMU propagation module 360, optimization module 370, reprojection error calculation module 383, feature metric error calculation module 382, inertial error calculation module 381, volume construction module 331, search module 333, mapping module 332, relationship construction module 339, image processing device 400, processor 401, communication bus 402, network interface 403, input/output interface 404, memory 405, power module 406, electronic device 500, memory 502. processor 501, described herein, including descriptions with respect to respect to FIGS. 1-5, are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in, and discussed with respect to, FIGS. 1-5 that perform the operations described in this application are performed by computing hardware, for example, by one or more processors or computers, implemented as described above implementing instructions (e.g., computer or processor/processing device readable instructions) or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method with image processing, the method comprising:

obtaining a visual association feature indicating an association between a first image frame and a second image frame and a visual appearance feature indicating the same object appearance in the first image frame and the second image frame;

determining a flow correction feature map that corrects an optical-flow error between the first image frame and the second image frame;

determining a corrected mapping value by correcting a first mapping value using the flow correction feature map;

constructing a visual reprojection constraint based on the visual association feature using the corrected mapping value;

constructing a visual feature metric constraint based on the visual appearance feature; and performing localization and mapping based on the visual reprojection constraint and the visual feature metric constraint.

2. The method of claim 1, wherein the constructing of the visual reprojection constraint based on the visual association feature comprises:

determining the second image frame associated with the first image frame based on the visual association feature;

obtaining a first associated feature map comprising a feature indicating the association between the first image frame and the second image frame;

obtaining a corrected mapping value by correcting a the first mapping value in which an image measurement value of the first image frame is mapped to the second image frame based on the first associated feature map; and constructing the visual reprojection constraint based on the image measurement value of the first image frame and the corrected mapping value.

3. The method of claim 2, wherein the obtaining of the corrected mapping value by correcting the first mapping value in which the image measurement value of the first image frame is mapped to the second image frame based on the first associated feature map comprises:

determining the flow correction feature map that corrects an optical flow error, based on the first associated feature map; and correcting the first mapping value in which the image measurement value of the first image frame is mapped to the second image frame based on the flow correction feature map.

4. The method of claim 3, wherein the determining of the flow correction feature map based on the first associated feature map comprises determining the flow correction feature map and a visual reprojection confidence, based on the first associated feature map, and the constructing of the visual reprojection constraint based on the visual association feature comprises constructing the visual reprojection constraint based on the image measurement value of the first image frame, the corrected mapping value, and the visual reprojection confidence.

5. The method of claim 3, wherein the determining of the flow correction feature map based on the first associated feature map comprises determining the flow correction feature map and a visual feature metric confidence, based on the first associated feature map, and the constructing of the visual feature metric constraint based on the visual appearance feature comprises constructing the visual feature metric constraint, based on the visual appearance feature of the first image frame, the visual appearance feature of the second image frame, and the visual feature metric confidence.

6. The method of claim 3, wherein the determining of the flow correction feature map based on the first associated feature map comprises obtaining any one or any combination of any two or more of the flow correction feature map, the visual reprojection confidence, and the visual feature metric confidence, by processing the first associated feature map, a context feature of the first image frame, and the first mapping value through a first neural network.

7. The method of claim 2, wherein the obtaining of the first associated feature map between the first image frame and the second image frame comprises determining the first associated feature map between the first image frame and the second image frame from an associated feature matrix, using the first mapping value, and the associated feature matrix is determined based on the visual association feature of the first image frame and the visual association feature of the second image frame.

8. The method of claim 2, wherein the first mapping value is obtained by mapping the image measurement value of the first image frame to the second image frame, based on first pose information estimated from the first image frame, inverse depth information, and second pose information estimated from the second image frame.

9. The method of claim 1, wherein the constructing of the visual feature metric constraint based on the visual appearance feature comprises:

determining the second image frame associated with the first image frame based on the visual association feature; and constructing the visual feature metric constraint based on the visual appearance feature of the first image frame and the visual appearance feature of the second image frame.

10. The method of claim 1, further comprising:

obtaining one or more image frames comprising the first image frame using a sliding window; and updating pose information and inverse depth information of each of the one or more image frames, by performing local bundle adjustment based on the visual reprojection constraint and the visual feature metric constraint of each of the one or more image frames.

11. The method of claim 10, further comprising updating the pose information and the inverse depth information of each of the one or more image frames by performing global bundle adjustment based on the visual reprojection constraint and the visual feature metric constraint of the one or more image frames, in response to performing the local bundle adjustment on the one or more image frames.

12. The method of claim 1, further comprising:

determining the second image frame associated with the first image frame based on the visual association feature;

obtaining inertial measurement unit (IMU) data of the first image frame and the second image frame; and constructing an inertial constraint based on the IMU data, wherein the performing of the localization and mapping based on the visual reprojection constraint and the visual feature metric constraint comprises:

obtaining any one or any combination of any two or more of pose information, motion information, and inverse depth information of the first image frame by performing bundle adjustment based on the visual reprojection constraint, the visual feature metric constraint, and the inertial constraint; and performing the localization and mapping based on the obtained any one or any combination of any two or more of the pose information, the motion information, and the inverse depth information.

13. The method of claim 12, wherein the constructing of the inertial constraint based on the IMU data comprises:

obtaining inertial motion association information about inertial motion from the first image frame to the second image frame and a pre-integrated weight by pre-integrating the IMU data; and constructing the inertial constraint based on the inertial motion association information and the pre-integrated weight.

14. The method of claim 13, wherein the constructing of the inertial constraint based on the inertial motion association information and the pre-integrated weight comprises:

determining third pose information of the first image frame based on the inertial motion association information, the pose information, and the motion information;

determining a second mapping value in which the image measurement value of the first image frame is mapped to the second image frame, based on the third pose information;

determining a second associated feature map between the first image frame and the second image frame from an associated feature matrix using the second mapping value;

obtaining an IMU confidence by processing the second associated feature map, a context feature of the first image frame, and the second mapping value, through a second neural network;

obtaining an inertial weight based on the pre-integrated weight and the IMU confidence; and constructing the inertial constraint based on the inertial motion association information and the inertial weight.

15. The method of claim 12, further comprising:

obtaining one or more image frames comprising the first image frame using a sliding window; and updating the pose information, the inverse depth information, and the motion information of each of the one or more image frames by performing local bundle adjustment based on the visual reprojection constraint, the visual feature metric constraint, and the inertial constraint of each of the one or more image frames.

16. The method of claim 15, further comprising updating the pose information, the inverse depth information, and the motion information of each of the one or more image frames by performing global bundle adjustment based on the visual reprojection constraint, the visual feature metric constraint, and the inertial constraint of the one or more image frames, in response to performing the local bundle adjustment on the one or more image frames.

17. A non-transitory computer-readable storage medium storing instructions that, when executed by one or more processors, configure the one or more processors to perform the method of claim 1.

18. An electronic device, comprising:
one or more processors configured to:
    obtain a visual association feature indicating an asso-
        ciation between a first image frame and a second
        image frame and a visual appearance feature indi-
        cating the same object appearance in the first image
        frame and the second image frame;
    determining a flow correction feature map that corrects an
        optical-flow error between the first image frame and the
        second image frame;
    determining a corrected mapping value by correcting a
        first mapping value using the flow correction feature
        map;
    construct a visual reprojection constraint based on the
        visual association feature using the corrected map-
        ping value;
    construct a visual feature metric constraint based on the
        visual appearance feature; and perform localization and mapping based on the visual
        reprojection constraint and the visual feature metric
        constraint.

19. The electronic device of claim 18, wherein, for the constructing of the visual reprojection constraint based on the visual association feature, the one or more processors are configured to:
    determine the second image frame associated with the
        first image frame based on the visual association fea-
        ture;
    obtain first associated feature map comprising a feature
        indicating the association between the first image frame
        and the second image frame;
    obtain a corrected mapping value by correcting the first
        mapping value in which an image measurement value
        of the first image frame is mapped to the second image
        frame based on the first associated feature map; and
    construct the visual reprojection constraint based on the
        image measurement value of the first image frame and
        the corrected mapping value.

20. The electronic device of claim 19, wherein, for the obtaining of the corrected mapping value, the one or more processors are configured to:
    determine the flow correction feature map that corrects an
        optical flow error based on the first associated feature
        map; and
    correct the first mapping value in which the image mea-
        surement value of the first image frame is mapped to
        the second image frame based on the flow correction
        feature map.

* * * * *